United States Patent
Spilkin et al.

[11] Patent Number: 6,033,068
[45] Date of Patent: Mar. 7, 2000

[54] INTEGRAL BI-DIRECTIONAL HAND-HELD READING GLASSES

[75] Inventors: Jonathan Spilkin; Ian Peter Solo, both of Thornhill, Canada

[73] Assignee: Optego Corporation, Toronto, Canada

[21] Appl. No.: 09/241,868

[22] Filed: Feb. 2, 1999

[51] Int. Cl.[7] ..................................................... G02C 5/14
[52] U.S. Cl. ............................ 351/112; 351/41; 351/158
[58] Field of Search ............................. 351/41, 112, 51, 351/52, 158

[56] References Cited

U.S. PATENT DOCUMENTS

| | | | |
|---|---|---|---|
| 4,445,760 | 5/1984 | Simms | 351/95 |
| 4,840,476 | 6/1989 | Rooney | 351/63 |
| 5,024,515 | 6/1991 | Beckemeyer et al. | 351/52 |
| 5,110,197 | 5/1992 | Arad | 351/41 |
| 5,189,445 | 2/1993 | Stagner | 351/46 |
| 5,559,566 | 9/1996 | Hansman | 351/156 |
| 5,576,776 | 11/1996 | Scheller | 351/63 |
| 5,604,548 | 2/1997 | Kanbar | 351/41 |

*Primary Examiner*—Huy Mai
*Attorney, Agent, or Firm*—Bereskin & Parr

[57] ABSTRACT

The present invention provides low cost, integral, bi-directional, plastic reading glasses formed by injection molding having a number of different attachment means including an integral clip, a tethering location, and optional attachment pad accessories for attaching the reading glasses to one of any number of locations. The low per unit cost and the various attachment features are designed to significantly increase the availability of reading glasses when and where required for short-term vision assistance.

9 Claims, 4 Drawing Sheets

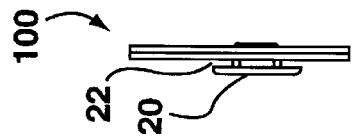
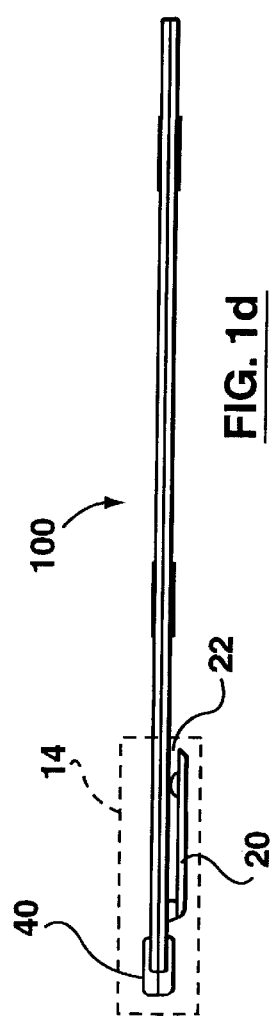
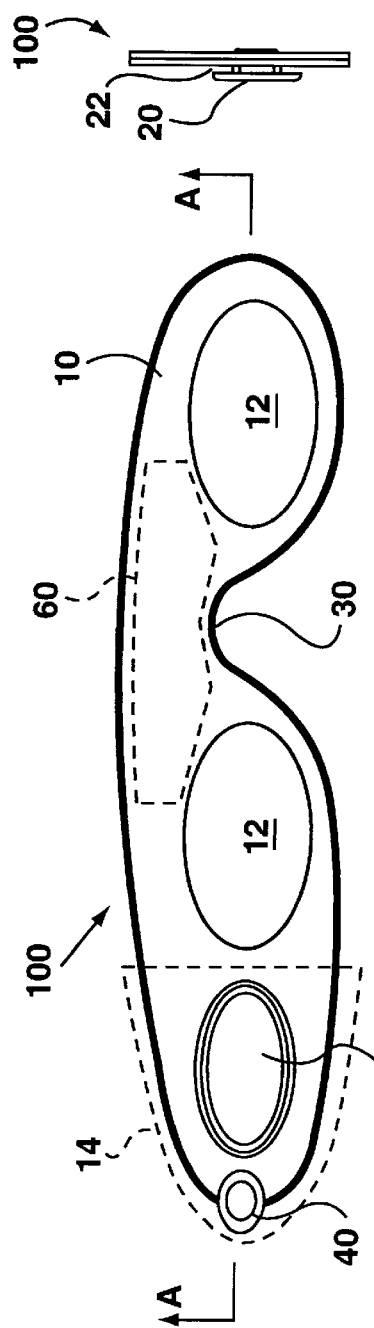
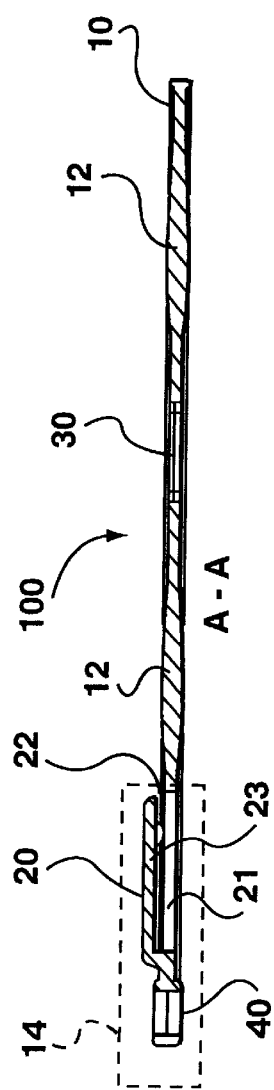

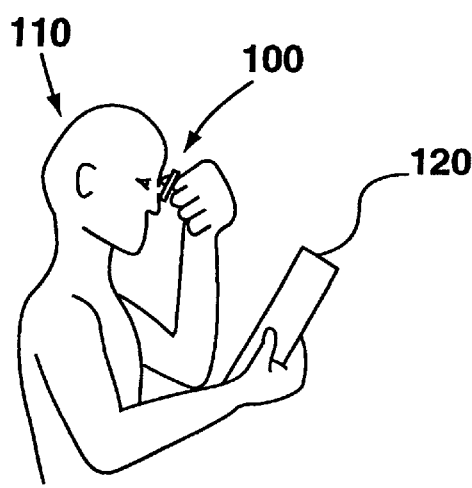
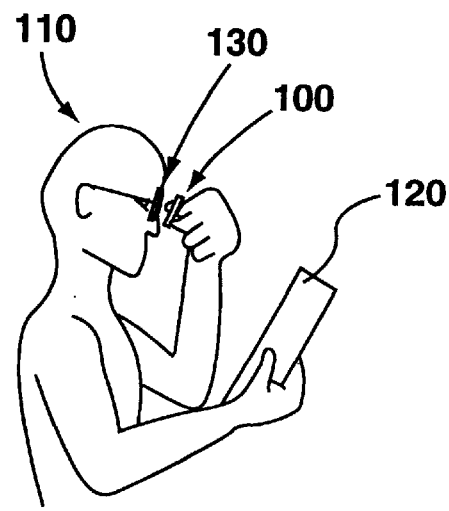
FIG. 3a          FIG. 3b
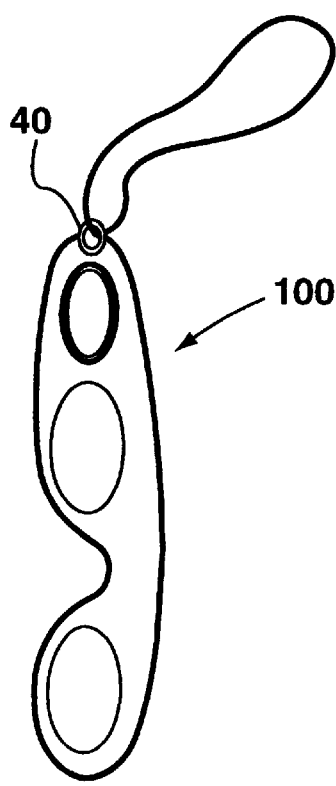
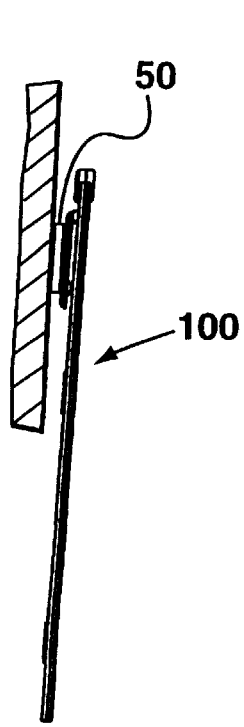
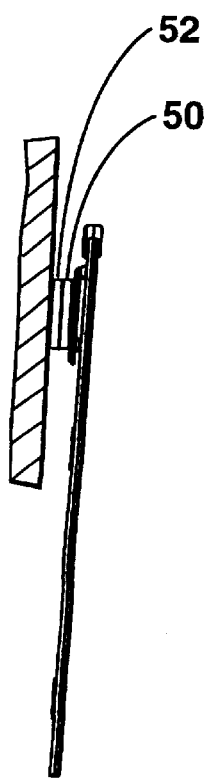
FIG. 6          FIG. 5a          FIG. 5b

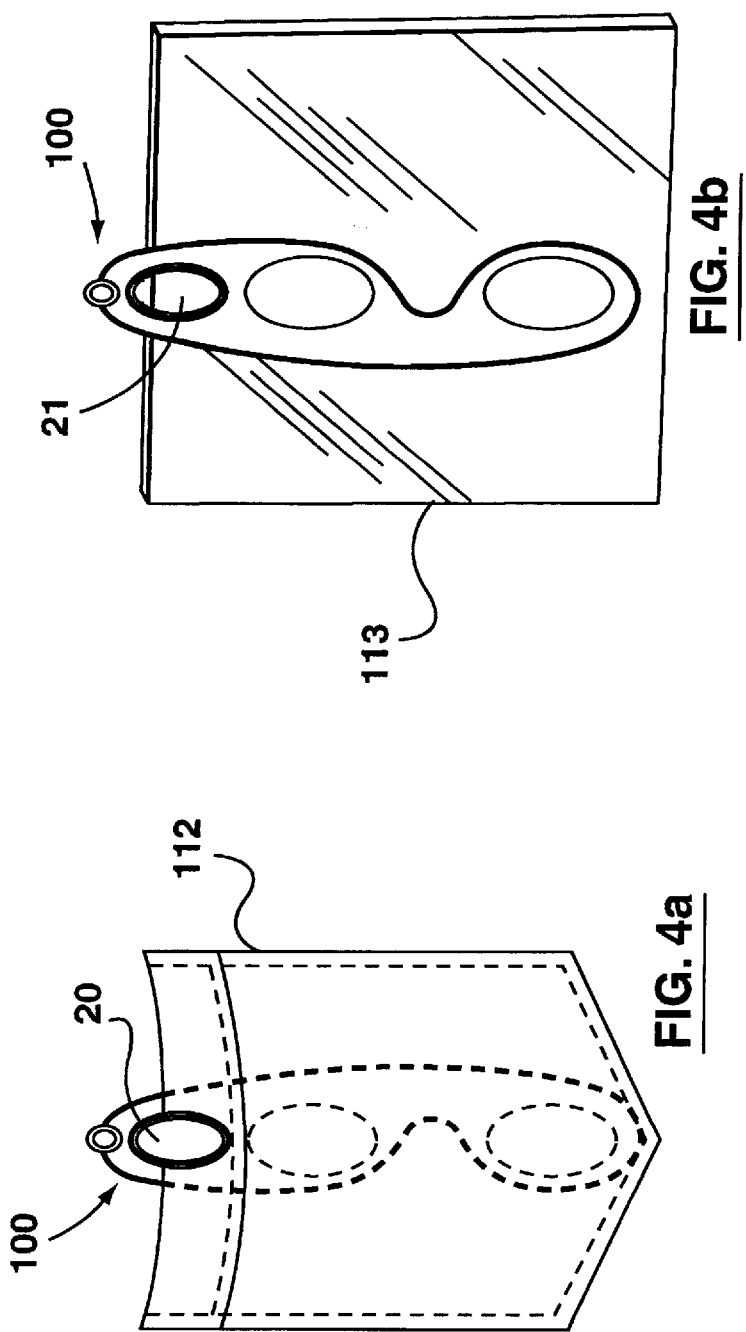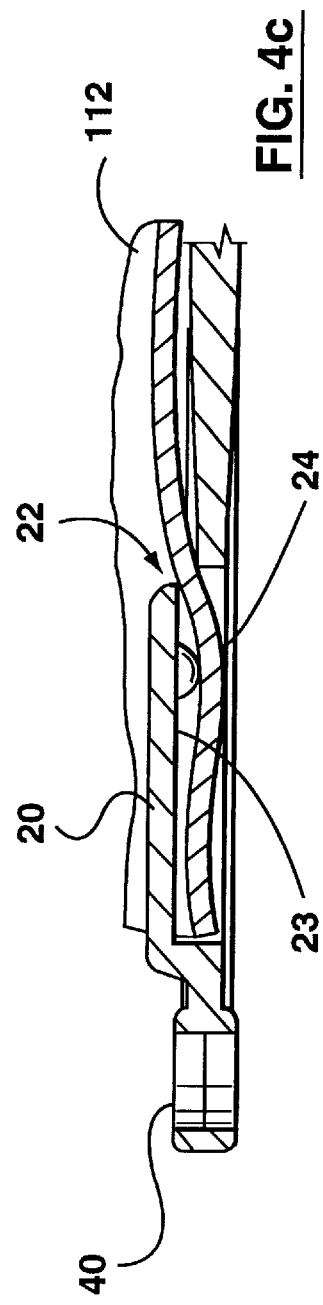

INTEGRAL BI-DIRECTIONAL HAND-HELD READING GLASSES

FIELD OF THE INVENTION

The present invention relates to eyeglasses and more particularly to reading glasses for aiding people with presbyopia which are hand-held in use.

BACKGROUND OF THE INVENTION

Presbyopia is an age related condition that makes it difficult for people to see objects up close. As people age, the crystalline lens within the eye hardens and loses the elasticity that is required to focus on close objects. Presbyopia may seem to occur suddenly, but the actual loss of flexibility takes place over a number of years. Presbyopia usually becomes noticeable in the early to mid-forties. This condition is a natural part of the eye's aging process. It is not a disease and cannot be prevented. Presbyopia will affect everyone, including people who wear glasses to correct distance vision, astigmatism, or a combination of both. Presbyopia is overcome by the use of corrective reading glasses and by other means including bifocal lenses, magnifiers, contact lenses and controversial corrective eye surgery.

Various designs for reading glasses are known. Conventional reading glasses comprise plastic or glass corrective lenses secured within plastic, or metal rim-type eyeglass frames. The frames typically have a pair of ear retainers hingedly connected to either end, so that the reading glasses can be worn on the bridge of the nose and secured by the ears of the wearer. While such conventional designs for reading glasses work well when properly prescribed and worn, because reading glasses are used to supplement the use of distance vision glasses or contact lenses, they are often forgotten or left behind because they are inconvenient to carry.

While bifocals have been developed to address the problem of forgetting or leaving behind reading glasses, many people find bifocals disorienting, particularly when viewing at an angle where the reading portion of the lens meets the distance portion of the lens. Consequently, many people choose not to wear bifocals and instead keep a separate pair of reading glasses.

Magnifiers may also be used to address presbyopia but they have a field of view which is limited by the size of the magnifier and the distance held from the reading material. Their size and their long handles make them bulky and cumbersome to carry. Finally, as magnifiers do not provide binocular vision, a reader is sometimes required to close one eye in order to achieve viewing clarity.

Contact lenses and surgical techniques are also available to correct presbyopia. However, contact lenses have their drawbacks, as will be appreciated by people who have worn them, and surgical techniques are expensive and still being perfected.

As a result, situations often arise where reading glasses are required but are not readily at hand. Some examples of these frustrating situations include: being in a candlelit restaurant unable to make out the menu entrees; standing in front of the medicine cabinet unable to read prescription dosage instructions; locating a map in the glove compartment but unable to read the small print; searching for a number in the telephone book but unable to read the listings, etc. Thus, there is a need for increased availability of reading glasses so that they are readily available when and where they are required to provide short-term vision assistance for reading.

A major limiting factor in determining the level of availability is cost. Conventional reading glass designs typically require many manufacturing steps and involve the assembly of many parts resulting in a fairly high per unit cost. Thus, the cost of purchasing multiple units of conventional reading glasses for placement in various convenient locations may be prohibitively expensive.

Designs have been proposed which attempt to lower the per unit cost of reading glasses. For example, an integral design for reading glasses is disclosed in U.S. Pat. No. 5,559,566 (Hansman). However, the reading glasses in Hansman '566 still require the assembly of spring clamps at either end of the integral front piece design for connection of a necklace support. In addition, the reading glasses disclosed in Hansman '566 are designed to be supported on the nose of the wearer and do not provide a handle for hand-held operation. Furthermore, according to the Hansman '566 disclosure, at column 2, lines 29 and 30, the lens portion of the design is made in strengths between 1.00 through 4.00 in quarter increments. Thus, the Hansman '566 design contemplates customized prescriptions for use by one person. While a customized prescription is desirable for long term reading, it is not strictly necessary for short-term reading assistance. The need to manufacture lenses of different strengths for different wearers may tend to increase manufacturing costs, since different tools and/or tool adjustments will be required in order to produce lenses having a plurality of different strengths. For example, providing lens strengths between 1.00 through 4.00 (in quarter increments) will require thirteen different versions of the product. Having many different versions of a product will also introduce various logistics problems and issues with product manufacturing and marketing which would otherwise be avoided. Furthermore, it can also be noted that the Hansman '566 design is not planar, and hence is not readily suited to storage inside, say, a telephone directory or restaurant menu.

The present invention is designed to overcome the drawbacks in the prior art, as identified above.

SUMMARY OF THE INVENTION

In a first aspect, the present invention provides integral reading glasses, comprising a generally flat elongate frame having two transparent, corrective lenses integrally formed therein; and an integral handle extending from an end of the elongate frame.

Preferably, the reading glasses are double convex and bi-directional.

More preferably, the reading glasses further comprises an integral, flexible, resilient clip formed by a substantially U-shaped section of the handle, the clip being substantially parallel to the frame and forming a slight gap between the frame and an opposing surface of the clip, so as to allow the reading glasses to be clipped to a pocket and to pages and covers of reading materials.

Advantageously, the clip may include at least one smooth protuberance located on the opposing surface of the clip and near the entrance to the gap, so as to assist in gripping on to a pocket or on pages and covers of reading materials.

To allow the reading glasses to be molded in a two-part mold, the reading glasses includes a clip opening adjacent the clip, whereby in a direction perpendicular to the frame, there are no overlapping portions of the reading glasses.

Preferably, the reading glasses includes a bridge section formed by a substantially V-shaped indentation positioned along a lengthwise edge and located centrally between the lenses, so as to allow positioning of the lenses over the eyes of a wearer.

More preferably, space is provided opposite the bridge section and centrally between the lenses for printing and labelling promotional messages.

Conveniently, a reinforced opening may be provided near an edge of the frame so as to provide a tethering location.

BRIEF DESCRIPTION OF THE DRAWINGS

FIG. 1c is a front view of the preferred embodiment of the present invention;

FIG. 1d is a top view of the present invention shown in FIG. 1c;

FIG. 1e is a side view of the present invention taken in the direction of arrow B in FIG. 1c;

FIG. 2 is a cross-sectional view of the present invention taken along the line A—A shown in FIG. 1c;

FIG. 3a shows a side view of the present invention in use;

FIG. 3b shows a side view of the present invention in use together with conventional glasses;

FIG. 4a is a partially hidden front view of the present invention, shown clipped inside a shirt pocket;

FIG. 4b is a rear view of the present invention, shown clipped to the cover of, say, a telephone book;

FIG. 4c is a detailed cross-sectional side view of the clip portion of the present invention clipped onto a shirt pocket;

FIG. 5a is a side view of the present invention including a magnetic vinyl strip pad accessory for attaching the present invention to a vertical surface;

FIG. 5b is a side view of the present invention including a complementary pair of hook and loop fasteners;

FIG. 6 is a front view of the present invention with a tethering line connected to the reinforced opening.

DETAILED DESCRIPTION OF THE INVENTION

Figure 1A:
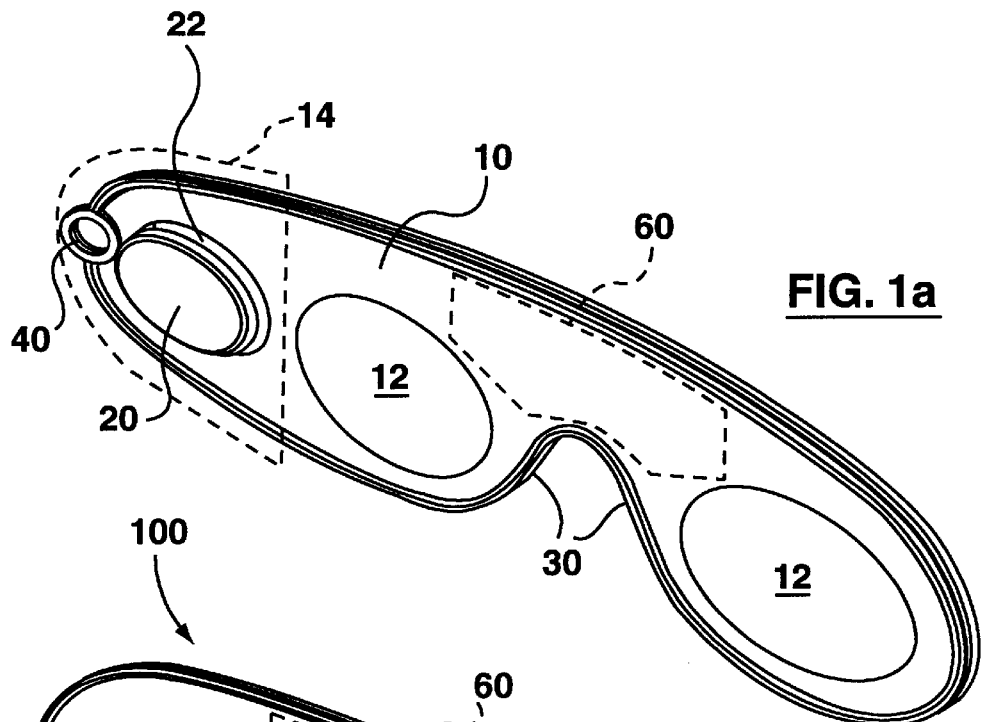
FIG. 1a is an isometric front view of the present invention.
Figure 1B:
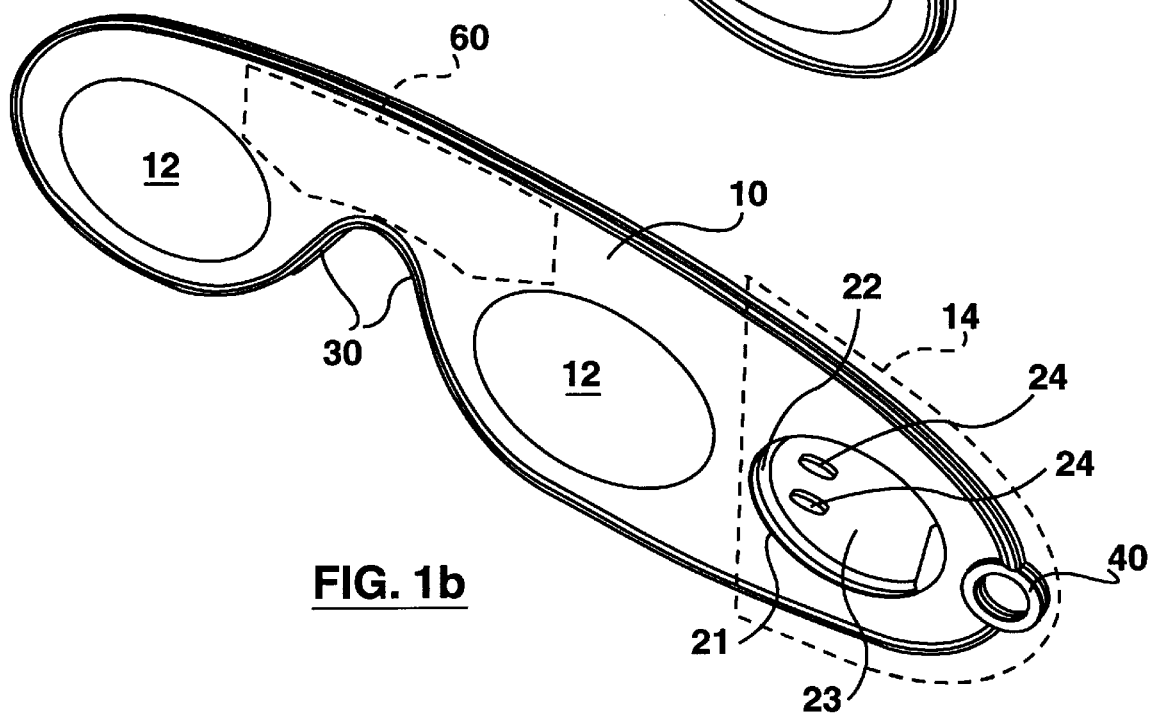
FIG. 1b is an isometric rear view of the present invention.

Referring to FIGS. 1a–1c, the preferred embodiment of the reading glasses according to the present invention is shown and generally referred to by reference numeral 100. The reading glasses 100 comprise a generally flat elongate frame 10 having two corrective lenses 12 integrally formed therein. The optical centers of the lenses 12 are set an appropriate distance apart at approximately 60 mm (the adult population average for the distance between the centers of the eyes for near vision), to substantially fit the eyes of most of the presbyopic population.

Extending from one end of the elongate frame 10 is an integral handle 14 which is used to hold the reading glasses 100 in front of the eyes of a wearer during use. As explained further below, the reading glasses 100 according to the present invention facilitate both right-handed and left-handed operation.

Also shown in FIGS. 1a–1c is a generally U-shaped integral clip 20 which forms part of the integral handle 14. In use, the clip 20 allows the reading glasses 100 to be clipped onto various parts of clothing, or onto pages and covers of various reading materials, as discussed further below.

Still referring to FIGS. 1a–1c, the frame 10 includes a bridge section 30 formed by a substantially V-shaped notch cut from a lengthwise edge of the frame 10 and located centrally between the lenses 12. The bridge section 30 is tapered and assists the wearer in positioning the lenses 12 properly in front of the eyes. However, it is noted that it is not strictly necessary to place the bridge section 30 on the nose in order to use the reading glasses 100 properly. As explained below, it is also possible to use the reading glasses 100 to supplement conventional distance vision glasses or bifocals, in which case the reading glasses 100 will simply be held in front of the conventional distance vision glasses or bifocals.

Also shown in FIGS. 1a–1c, at one end of the reading glasses 100, is a reinforced opening 40 which provides a tethering location. The opening 40 is reinforced by a ring of material surrounding the opening which is thicker than the overall thickness of the frame 10.

Now also referring to FIGS. 1d and 1e, the reading glasses 100 are shown in profile, along the length and width, respectively. As shown in FIGS. 1a, 1b, 1d and 1e, the clip 20 is formed substantially parallel to, and slightly aside from the plane in which the frame 10 of the reading glasses 100 generally lies. A small gap 22 is provided between the opposing surfaces of the clip 20 and the frame 10 so that an edge of a piece of clothing, or the pages or covers of reading material, can be inserted into the gap 22 and under the clip 20. As shown in FIG. 1b, beneath the clip 20, there is an clip opening 21 (also shown in FIG. 2) having a shape substantially corresponding to the clip 20, to enable the reading glasses 100 to be molded in a two-part mold, in known manner.

Now referring to FIG. 2, the reading glasses 100 of FIGS. 1a–1e is shown in cross-section and the lenses 12 are shown as being integrally formed from the same material as the frame 10. The lenses 12 which are formed in the frame 10 are preferably double convex lenses which provide a full field of vision when placed near the eyes of the wearer. Importantly, the double convex construction of the lenses 12 allows the reading glasses 100 to be used bi-directionally. That is, the reading glasses 100 facilitate both left-handed and right-handed operation since the field of vision is the same from either side of the lenses 12.

In the embodiment shown, the frame 10 is shown to be slightly thinner than the maximum thickness of the lens 12. To avoid grooves which could collect dirt and grime, the lenses 12 at their edges could be smoothly continuous with the frame 10, although this is not absolutely necessary. Alternatively, if a particular usage may cause concern with abrasion etc., the outer edge of frame 10 can be formed thicker than the lens 12, so the lenses 12 are recessed and would be protected to at least some extent. Furthermore, the use of a scratch resistant material would also help.

As illustrated in FIG. 3a, for those people wearing contact lenses or those people who do not require correction for distance vision, the reading glasses 100 are used by holding the reading glasses 100 in position in front of the eyes of the wearer 110, while the object 120 being viewed is held in the other hand. Alternatively, as illustrated in FIG. 3b, for those people who wear conventional glasses for distance vision, or those people who wear conventional bifocal glasses but who require additional vision assistance (both types of glasses are generally referred to by reference numeral 130), the reading glasses 100 are used by holding the reading glasses 100 in front of the distance or bifocal glasses 130. Focus is obtained by adjusting the distance between the eyes of the wearer 110 and the object 120 being viewed. Typically, the object 120 being viewed will come into focus at a distance of between about 6" and 20" from the eyes of the reader but this distance may vary.

Although different lens strengths may be used to practice the teachings of this invention, preferably, by providing a strength of between about 1.75 to 2.75, and more preferably about 2.25, it is expected that the lenses 12 of the present invention will sufficiently serve the needs of a substantial majority of the presbyopic population for short-term vision assistance. It is noted that the presbyopic population considered here includes people in the early stages of presbyopia who do not require glasses for distance vision, as well as those people who wear glasses or contact lenses to correct distance vision and/or astigmatism. Furthermore, people who wear bifocal glasses but who require stronger prescriptions for reading may find the added strength provided by the reading glasses 100 useful for short-term vision assistance. Also, people who wear bifocal glasses may find the reading glasses 100 useful as an aid for viewing objects which are placed so high that it is necessary to strain the head backwards to use the reading portion of the bifocal glasses.

Since using a lens strength of between about 1.75 and 2.75, and more preferably about 2.25, will meet the short-term vision assistance needs of a substantial majority of the presbyopic population, there is no need to prepare many different molds for lenses having many different strengths. As will be appreciated by those skilled in the art, the cost associated with preparing a mold may constitute a significant portion of the cost of the product. Thus, reducing the number of molds required will significantly reduce the per unit cost of the reading glasses 100.

Since the frame 10, the lenses 12, the handle 14, the clip 20, and the reinforced opening 40 are injection molded as one piece in a single injection molding operation, and no further manual assembly operations are required to use the product, a low per unit cost is achieved. Furthermore, the integral frame and lens design allows the reading glasses 100 to be extra thin, while provided the necessary strength, thus minimizing the cost of raw materials.

Preferably, the reading glasses 100 are manufactured from an optical grade plastic. As will be understood by those skilled in the art, certain optical grade plastics provide better scratch resistance while other plastics provide increased strength or resiliency. As the refractory index of most optical grade plastics are similar, the material used to manufacture the reading glasses is not critical. By way of example, polycarbonate plastic provides good optic clarity, the necessary strength for the frame 10 and the necessary resilient flexibility for the clip 20. However, as explained other optical grade plastics, may be used in place of polycarbonate plastic to practice the teachings of the present invention. As will be appreciated by those skilled in the art, the areas of the mold which will form the lenses 12 have to be specially polished in order to provide the best optic clarity for the reading glasses 100.

Now referring to FIGS. 4a and 4b, the reading glasses 100 of the present invention are shown clipped to a shirt pocket 112 and a telephone directory 113, respectively, by way of example. As explained above, the injection molding process used to manufacture the reading glasses 100 allows the clip 20 to be formed as an integral part of the reading glasses 100, thus eliminating any further manual assembly operation. Also, the plastic material, such as polycarbonate plastic, allows sufficient resilient flexibility so that the clip 20 can clip the reading glasses 100 securely to a piece of clothing or to pages and covers of reading materials.

Referring now to FIG. 4c, as shown in a detailed cross-sectional view of the clip 20, an edge of a shirt pocket 112 has been inserted into gap 22. The clip 20 provides an opposing surface 23 which allows the reading glasses 100 to be held securely on to the edge of the shirt pocket 112. To assist in securing the reading glasses 100 to the shirt pocket 112, and to prevent the clip 20 from snagging on the edge of the shirt pocket, smooth protuberances 24 are located on the opposing surface 23 of the clip 20, near the opening of the gap 22.

While FIG. 4c illustrates a specific example where the reading glasses 100 are clipped onto a shirt pocket 112, it will be understood that, in a similar fashion, the clip 20 is equally functional in allowing the reading glasses 100 to be clipped onto other parts of clothing, and to the pages and covers of reading materials, such as telephone books, restaurant menus, magazines, or paperback books, etc.

Now referring to FIG. 5a, the reading glasses 100 are shown with an attachment pad accessory 50 which has a self-adhesive backing, and would be provided with a release sheet in known manner. The attachment pad accessory 50 may be applied by the wearer to one side of the handle 14, for example to top of the clip 20, or in any other suitable location on the frame 10, so as to allow the reading glasses 100 to be attached to a vertical or angled surface. The attachment pad accessory 50 may comprise a magnetic vinyl strip pad which allows the reading glasses 100 to be removably attached to magnetically attractive surfaces. Alternatively, as shown in FIG. 5b, the attachment pad accessory 50 may comprise a hook and loop fastener pad, such as is sold under the trade mark Velcro, so as to allow the reading glasses 100 to be removably attached to a complementary pad 52 mounted on a fixed surface. For this purpose, the eyeglasses could be sold with complementary pairs of hook and loop fastener pads 50, 52, each including an adhesive backing and a release sheet in known manner. For either of these attachment methods, it will be appreciated that convenient placement points may be created by the wearer by attaching magnetically attractive surface pads, or hook and loop surface pads, to various surfaces in any number of locations.

Now referring to FIG. 6, the reading glasses 100 are shown with a tether attachment looped through the reinforced opening 40. In the present invention, the reinforced opening 40 is placed near the edge of the handle 14 so as to allow the reading glasses 100 to be easily worn, for example, around the wrist. The reinforced opening 40 also allows the reading glasses 100 to be secured in a public location by a longer tether attachment (not shown) so that more than one person can use the reading glasses 100. As explained earlier, this is possible because a lens power suitable for most of the presbyopic population for short-term reading assistance is used in the present invention. For example, the reading glasses 100 may be tethered to grocery store product aisles, telephone booths, restaurant menus or bank transaction preparation podiums, etc.

Due to their attractive low cost, and the advantages inherent in the design, it is anticipated that the reading glasses 100 of the present invention may be offered as promotional items by various businesses, for example by restaurant owners providing a pair of the reading glasses along with the menu. In anticipation of this type of promotional use, the reading glasses 100 of the present invention provides a promotional writing area 60 on the surface of the frame 10, as illustrated by example in FIGS. 1a–1c. It will be appreciated that promotional writing may be placed in any number of locations on the reading glasses 100. A promotional message may be placed on the reading glasses 100 by any number of known methods for writing or printing on plastic surfaces. It is believed that it is preferable for this promotional area to be essentially flat.

It is envisaged that the reading glasses would be packaged for sale either individually or in sets of, say, five or ten. Each package could include an appropriate quantity of attachment pad accessories 50, 52, providing magnetic and/or hook and loop fastening.

While certain novel features of the present invention have been shown and described, it will be understood that various modifications, substitutions and changes in the details of the device can be made by those skilled in the art without departing from the spirit of the present invention.

We claim:

1. Integral reading glasses, comprising:
   (a) a generally flat elongate frame having two transparent, corrective lenses integrally formed therein, said lenses being double convex and bi-directional;
   (b) an integral handle extending from an end of said elongate frame; and
   (c) an integral, flexible, resilient clip formed by a section of said handle, said clip being substantially parallel to said frame and forming a slight gap between said frame and an opposing surface of said clip, so as to allow said reading glasses to be clipped to a pocket and to pages and covers of reading materials.

2. The reading glasses recited in claim 1, wherein said clip includes at least one smooth protuberance located on the opposing surface of said clip and near the entrance to said gap, so as to assist in gripping on to a pocket or on pages and covers of reading materials.

3. The reading glasses recited in claim 1, which includes a clip opening adjacent the clip, whereby in a direction perpendicular to the frame, there are no overlapping portions of the reading glasses.

4. The reading glasses recited in claim 1, wherein:
   the frame includes a bridge section formed by a substantially V-shaped indentation positioned along a lengthwise edge and located centrally between said lenses, so as to allow positioning of said lenses over the eyes of a wearer; and
   space is provided opposite said bridge section and centrally between said lenses, for printing and labelling promotional messages.

5. The reading glasses recited in claim 4, in combination with a magnetic vinyl strip pad accessory having a self-adhesive backing and a protective release sheet, said magnetic pad being attachable to one side of said frame by means of said self-adhesive backing, so as to allow said reading glasses to be attached to a magnetically attractive surface.

6. The reading glasses recited in claim 4, in combination with a pair of complementary hook and loop pads, each having a self-adhesive backing and a protective release sheet, whereby, one of said pair of pads is attachable to one side of said frame by means of said self-adhesive backing and the other of the pair of pads is attachable to a support surface by means of said other self-adhesive backing, for mounting said reading glasses to said support surface.

7. Integral reading glasses, comprising:
   (a) a generally flat elongate frame having two transparent, corrective lenses integrally formed therein;
   (b) an integral handle extending from an end of said elongate frame; and
   (c) an integral, flexible, resilient clip formed by a section of said handle, said clip being substantially parallel to said frame and forming a slight gap between said frame and an opposing surface of said clip, so as to allow said reading glasses to be clipped to a pocket and to pages and covers of reading materials.

8. The reading glasses of claim 7, wherein:
   the frame includes a bridge section formed by a substantially V-shaped indentation positioned along a lengthwise edge and located centrally between said lenses, so as to allow positioning of said lenses over the eyes of a wearer; and
   space is provided opposite said bridge section and centrally between said lenses, for printing and labelling promotional messages.

9. The reading glasses in any one of claims 1 or 7, wherein, said clip is substantially U-shaped.

* * * * *

UNITED STATES PATENT AND TRADEMARK OFFICE
CERTIFICATE OF CORRECTION

PATENT NO : 6,033,068
DATED : March 7, 2000
INVENTOR(S): Jonathan Spilkin; Ian Peter Solo It is certified that error appears in the above-identified patent and that said Letters Patent are hereby corrected as shown below:

In claim 9, line 1, delete "1" and substitute --1-3--.

Signed and Sealed this

Third Day of April, 2001

Attest:

NICHOLAS P. GODICI

Attesting Officer     Acting Director of the United States Patent and Trademark Office